March 16, 1937.   V. BENDIX ET AL   2,073,862
TURNTABLE
Filed Oct. 13, 1932   4 Sheets-Sheet 1
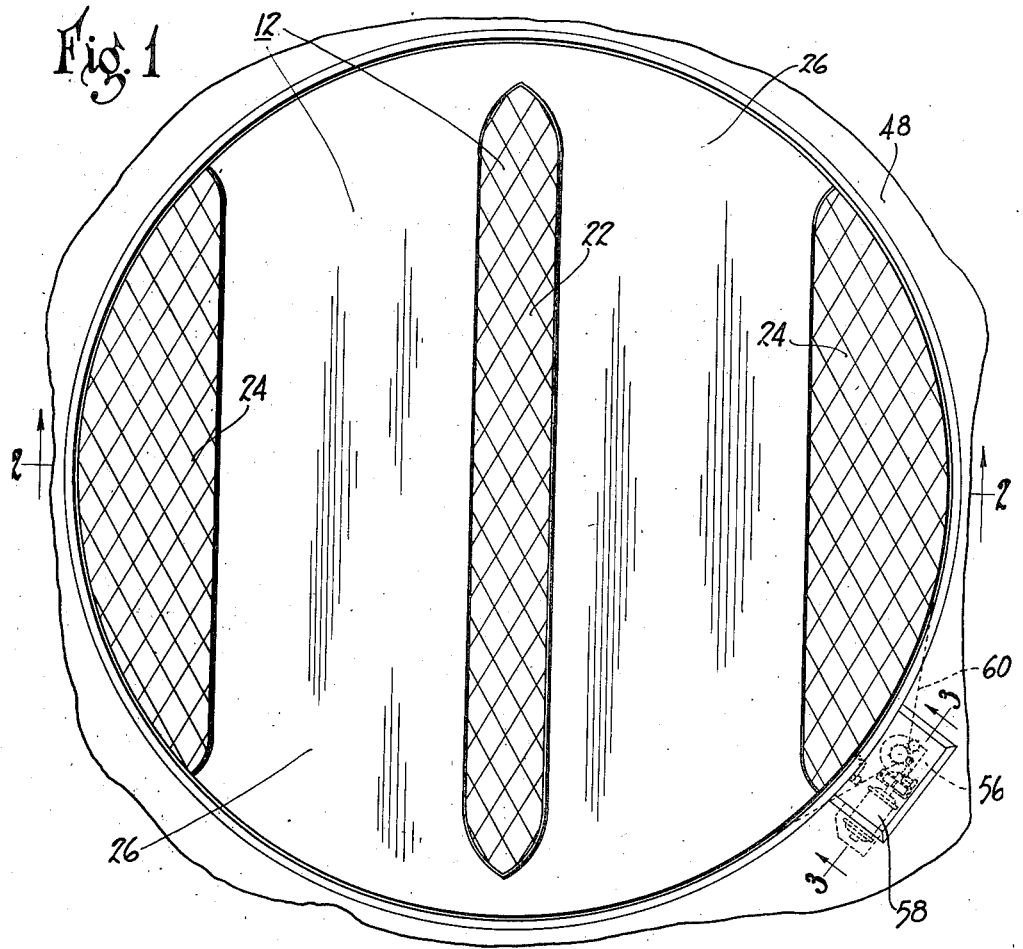
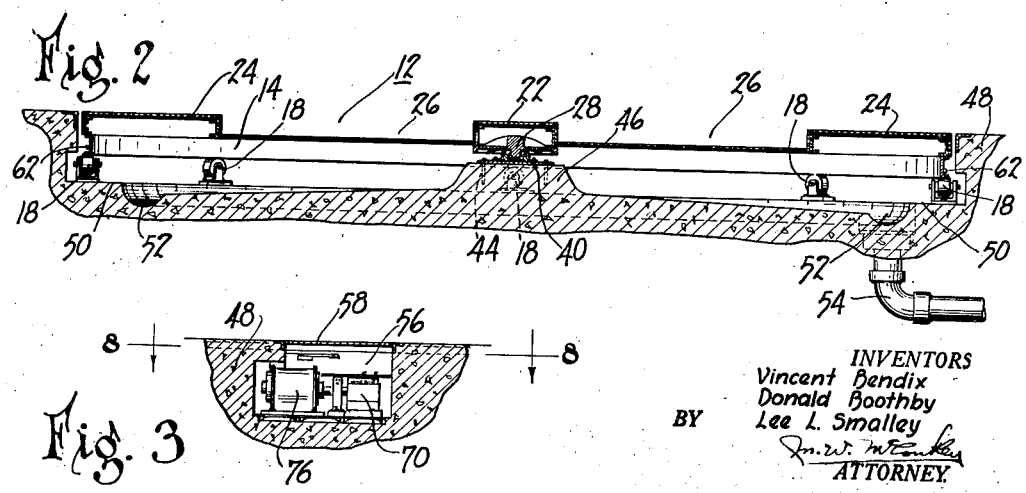
INVENTORS
Vincent Bendix
Donald Boothby
Lee L. Smalley
BY
ATTORNEY March 16, 1937. V. BENDIX ET AL 2,073,862
TURNTABLE
Filed Oct. 13, 1932 4 Sheets-Sheet 2

INVENTORS.
Vincent Bendix
Donald Boothby
BY Lee L. Smalley
ATTORNEY

March 16, 1937.  V. BENDIX ET AL  2,073,862
TURNTABLE
Filed Oct. 13, 1932  4 Sheets-Sheet 3

INVENTORS
Vincent Bendix
Donald Boothby
Lee L. Smalley
BY
ATTORNEY

March 16, 1937.  V. BENDIX ET AL  2,073,862
TURNTABLE
Filed Oct. 13, 1932   4 Sheets-Sheet 4
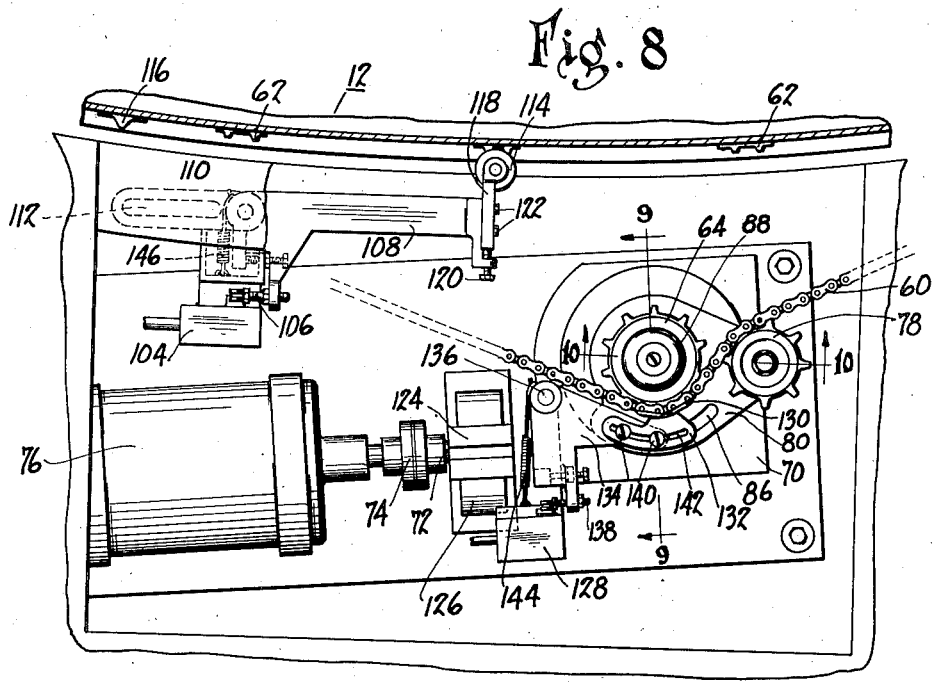
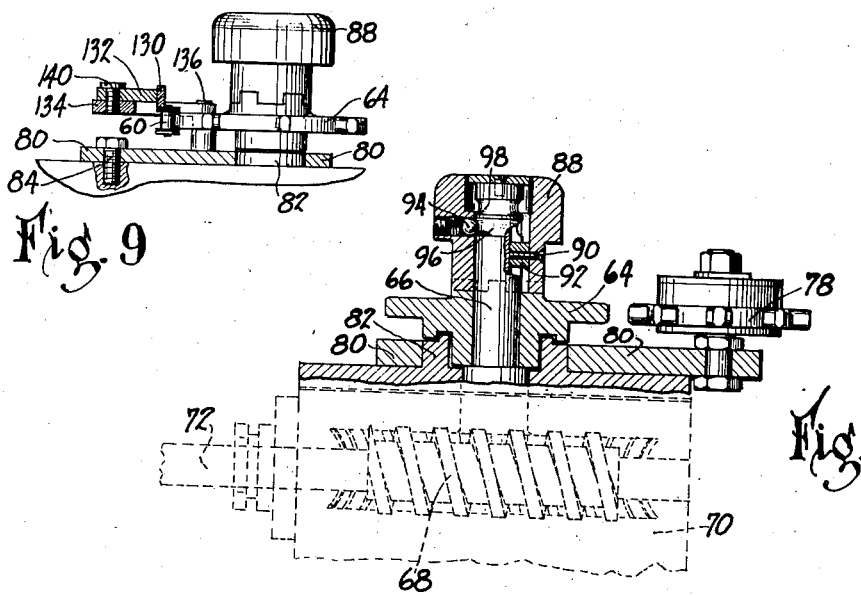
INVENTORS
Vincent Bendix
Donald Boothby
Lee L. Smalley
BY
ATTORNEY Patented Mar. 16, 1937

2,073,862

UNITED STATES PATENT OFFICE 2,073,862

TURNTABLE

Vincent Bendix and Donald Boothby, Chicago, Ill., and Lee L. Smalley, South Bend, Ind., assignors to International Engineering Corporation, Chicago, Ill., a corporation of Illinois Application October 13, 1932, Serial No. 637,586

9 Claims. (Cl. 192—142)

This invention relates to turntables for automobiles and the like, and is illustrated as embodied in a small power-driven turntable for use in connection with a dwelling house.

An object of the invention is to provide a compact and inexpensive construction, with a rotatable platform element preferably built up of structural steel and steel plates, and with the operating mechanism concealed and protected by the platform and its emplacement. Various features of novelty relate to the structure of the rotating platform and its emplacement, to a simple operating mechanism preferably including a novel reduction gear drive from an electric motor or the like to a sprocket chain engaging the periphery of the rotatable platform, and to improvements in the controls for stopping and starting and adjusting the operating mechanism.

The above and other objects and features of the invention, including various novel constructions and desirable arrangements of the parts, will be apparent from the following description of the illustrative embodiment shown in the accompanying drawings, in which:

Figure 1 is a top plan view of the turntable as installed;

Figure 2 is a vertical section therethrough on the line 2—2 of Figure 1;

Figure 3 is a partial vertical section through part of the emplacement, showing the arrangement for housing the drive mechanism below the floor level;

Figure 8 is a horizontal section, approximately on the line 8—8 of Figure 3, showing the driving mechanism;

Figure 9 is a partial section on the line 9—9 of Figure 8 showing the brake cam;

Figure 10 is a section on the line 10—10 of Figure 8, showing the adjustment of the idler sprocket which takes up slack in the driving sprocket chain.

Figure 4:
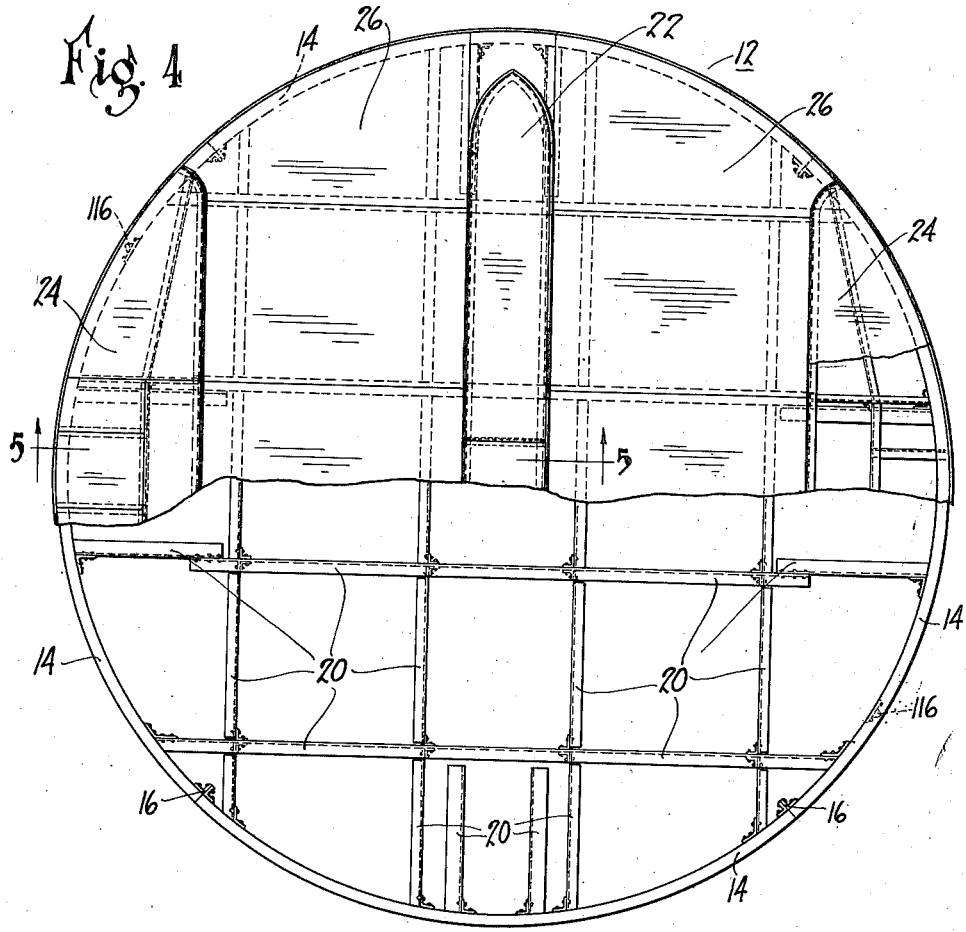
Figure 4 is a top plan view, partly broken away to show the transverse structural steel supporting elements, and showing the rotatable platform without its rubber facing.
Figure 5:
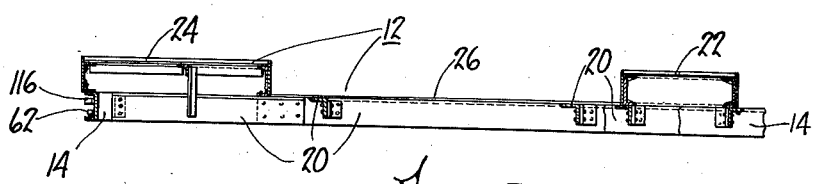
Figure 5 is a partial vertical transverse section, on the line 5—5 of Figure 4.

In the arrangement selected for illustration, the turntable comprises a rotatable platform 12, preferably built up, as shown in detail in Figures 4 and 5 and diagrammatically in Figure 2, on arcuate structural steel elements 14 having fittings 16 riveted to their ends and which fittings are riveted or bolted together to form a circular rim or base the bottom of which rolls on a series of supporting rollers 18 in any desired manner. Transverse structural steel elements 20 are riveted or bolted to angle brackets or other fittings carried by the base 14, and are riveted or bolted or otherwise secured together where they cross each other.

Upon the skeleton base so formed, a central diametric deck 22, and two segmental side decks 24, each formed of sheet steel plates mounted on a framework of structural steel, are mounted, defining on opposite sides of the central deck 22 parallel tracks 26 of steel plates secured directly to the above-described skeleton base. These tracks (for the wheels of the automobile as it is driven across the turntable) extend entirely across the turntable and are flush with the driveway which leads to the turntable.

Figure 6:
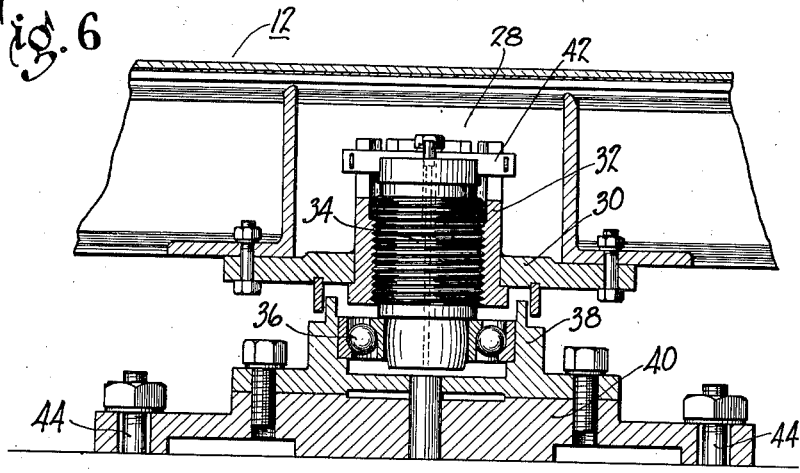
Figure 6 is an enlargement of the central portion of Figure 2, showing the central pivot for the rotatable platform.
Figure 7:
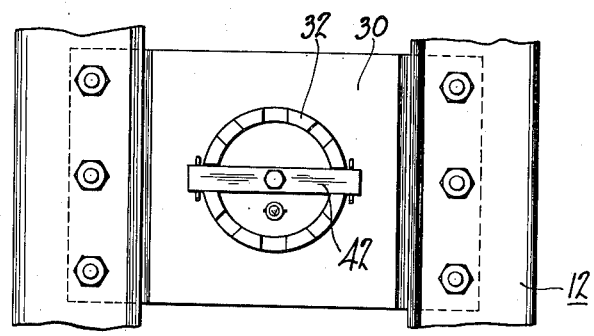
Figure 7 is a partial top plan view of Figure 6.

The turntable is rotatably mounted on a central pivot 28, shown in detail in Figures 6 and 7. This pivot includes a plate 30 bolted to the bottom of the skeleton frame, and resting on the lower end flange of an internally-threaded sleeve 32 threaded adjustably (as to height) upon a pivot member 34 resting on a ball bearing 36 seated in a base member 38 detachably mounted on a base plate 40. The adjustment of sleeve 32 and pivot 34 is held against unintended change by castellating the ends of the sleeve and pivot and keying them together by a removable transverse key 42 held by means such as cotter pins at its ends.

The entire upper surface of the turntable is preferably faced with rubber or the like.

The base plate 40 is mounted, by threaded studs 44 or the like, on the top of a central post 46 (Figure 2), forming the center of a concrete emplacement for the turntable. This emplacement includes a surrounding area 48 flush with the turntable, and having a shallow circular pit or depression for the turntable. This pit has a peripheral substantially level circular track 50 for the supporting rollers 18, just inside of which is an annular trough or drain 52 with a suitable outlet 54, and at the center of which is the post 46 surrounded by a portion sloping conically to the drain 52.

At one side there is a boxlike depression or housing 56, covered by a plate 58 and communicating with the shallow central pit, for the operating mechanism.

The turntable, as best shown in Figure 8, is driven by a sprocket chain 60 drivably meshing with or engaging teeth 62 mounted on the exterior face of the circular ring 14, and having a portion stretched away from ring 14 through the housing 56 to engage a drive sprocket 64 forming part of the drive mechanism, as shown in Figure 8.

The sprocket 64 is sleeved on the upper end of a vertical drive shaft 66 having a worm gear 68, or an equivalent gear reduction, in a gear-box 70, the worm gear meshing with and being driven by a worm on a shaft 72 connected by a suitable coupling 74 with the armature shaft of an electric motor 76.

In order to adjust the tension of the sprocket chain 60, an idler sprocket 78 may be mounted on an arm 80 adjustable about a boss 82 coaxial with respect to shaft 66, the adjustment being preserved by a clamp bolt 84 (Figure 9) in an arcuate slot 86 (Figure 8).

In order to permit operation of the turntable by hand, when something is wrong with the source of electricity, sprocket 64 may be keyed or clutched detachably to the drive shaft 66, for example, by having on its upper face integral teeth forming a jaw clutch interengaging with corresponding teeth on the bottom of a knob or clutch member 88 secured by a screw 90 or the like to a key 92 received in alined key slots in the shaft 66 and the knob 88. Knob 88 is yieldably held either in lower (engaged) position as shown, or in an upper (disengaged) position, by means such as a spring-pressed ball 94 seated in one or the other of two grooves 96 or 98.

Figure 11:
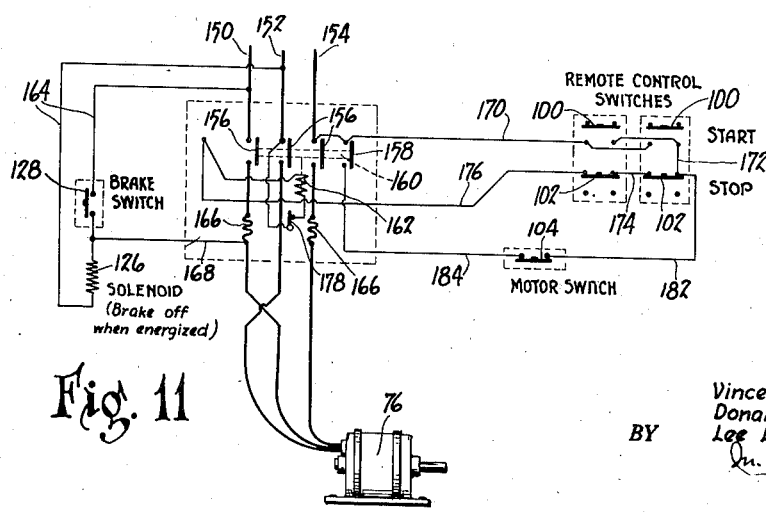
Figure 11 is a wiring diagram.

The motor circuit is controlled, as more fully described below, by either of a plurality of hand switches 100 (Figure 11), for example, one inside the house and one adjacent the turntable, or, by a corresponding plurality of emergency or "stop" switches 102 similarly located and operable to break the circuit quickly when something goes wrong, and by a cam-controlled switch 104 (Figures 8 and 11).

The switch 104 may be of any suitable and well-known type which is opened by thrust of means such as an adjustable setscrew 106 and closed again by a spring or the like within the switch when the thrust is relieved. Setscrew 106 is threaded into a boss in a bell crank lever 108 having its pivot 110 adjustable in a slot 112, and having at its end a roller or the like 114 just below the plane of the sprocket teeth 62, and in the path of two cams or lugs 116 mounted 180° apart on the base ring 12 of the turntable.

Thus the passage of either of the cams 116 over roller 114 momentarily opens the switch 104 and then allows it to close again. While the cams 116 might be made adjustable, it is simpler to adjust the angular position of the turntable, at the time switch 104 is opened, by adjustment of pivot 110 in slot 112. Roller 114 may also be made adjustable as by mounting it in a slide 118 operated by a screw 120 and clamped in position by screw 122 passing through a slot (not shown) in the slide.

Any standard type of brake may be provided, as for example a brake indicated at 124 and acting on shaft 72, and which is applied by a spring (not shown) within the brake when not held released or "off" by a solenoid 126 controlled by a switch 128.

The brake switch 128 is normally held closed (or "on") by a suitable spring within the switch, except when opened to allow the brake to apply itself automatically, by engagement of one of two cams 130 (spaced opposite each other on the sprocket chain 60) with an adjustable thrust member 132 carried by a bellcrank lever 134 mounted on a pivot 136 and carrying an adjustable setscrew 138 engaging the operating plunger of the switch 128. Member 132 is held in adjusted position on bellcrank lever 134 by clamp screws 140 passing through an arcuate slot 142 having its center approximately at the axis of shaft 66.

A spring 144 urges the switch lever 134 in a direction to permit switch 128 to close, and a corresponding spring 146 urges lever 108 in a direction permitting switch 104 to close.

Referring now more particularly to the wiring diagram in Figure 11, the operation of the turntable will be described. Current for the motor 76 may be supplied by the usual three-wire line including leads 150, 152, and 154, with 220 volts from lead 150 to lead 154 and 110 volts between lead 152 and each of leads 150 and 154. Switches 156 for the three leads, and another switch 158 referred to below, may be mounted on the plunger 160 of a solenoid switch, the coil of which is indicated at 162.

The brake solenoid 126 and the brake switch 128 are in a circuit 164 between leads 150 and 152. The three leads 150—152—154, after passing the switch 156 (and if desired through suitable temperature-controlled overload relays or circuit-breakers 166) are connected to the terminals of the motor 76. A shunt connection 168 leads from lead wire 150 to circuit 164, into which it is connected between the brake solenoid 126 and the brake switch 128.

The switch 156 is controlled by a 110 volt circuit connected between lead wires 152 and 154 and including a wire 170 leading from wire 154 to one terminal of switch 158, thence to two of the terminals of the remote control "start" switches 100. A wire 172 leads from the other terminals of the "start" switches 100 to one terminal of one of the "stop" switches 102. The "stop" switches 102 are interconnected in series by a wire 174 and are then connected by a wire 176 to one end of the solenoid switch 162, and this solenoid in turn is connected (if desired through a key-controlled switch or lock 178, which can be left open to prevent operation of the turntable when the house is closed for a considerable period) by a wire 180 with the lead wire 152.

The terminal of "stop" switch 102 which is connected to wire 172 is also shown connected by a wire 182 with the motor switch 104, which in turn is connected by a wire 184 with the lower terminal of switch 158 (and thence, when that switch is closed, to lead wire 154).

In operation, the various switches and circuits are all in the positions of Figure 11 when a car is driven onto the turntable. The brake is applied, and the motor and motor-switch and brake circuits are all open, with no current flowing.

Momentarily closing either of the "start" switches 100 against its spring now causes current to flow from the lead wire 154, through wire 170 and the closed switch 100, through wire 172 and both "stop" switches 102, through wire 176 and solenoid 162, back to wire 152. Solenoid 162 thereupon closes the solenoid switch 156—158, energizing the motor 76 and causing release of the brake by current flowing in the shunt circuit 152—168—126—164—150.

As soon as the turntable starts, cam 130 moves away from the thrust part 132, allowing the brake switch 128 to close, energizing the main brake-release circuit 152—164—126—128.

As soon as the operator releases the "start" switch 100, allowing it to open, the solenoid 162 is energized (to hold the switch 156 closed) by current flowing in the circuit 154—158—184—102—176—162—178—180.

The turntable is now driven by motor 76 through an angle of nearly 180° whereupon one of the two cams 116 momentarily opens the motor switch 104, which is in the last-described circuit, thereby opening the switch 156—158 and cutting off the motor 76.

The brake circuit 164, however, remains energized through the switch 128, and the inertia of the turntable and the car on it causes it to coast the remainder of the 180° until the corresponding one of the two cams 130 opens the switch 128 and the brake 124 automatically applies itself and stops the turntable smoothly and accurately in position to drive the car off again. The parts are all now in their original positions, ready to start another cycle when one of the switches 100 is closed.

While one illustrative arrangement has been described in detail, it is not our intention to limit the scope of the invention by that description or to that arrangement, or otherwise than by the terms of the appended claims.

We claim:

1. An automatic turntable or the like comprising a rotatable platform, a sprocket chain drivably engaging the periphery of the platform, power drive mechanism operatively engaging the sprocket chain, cam means on the periphery of the platform for throwing off the power of said mechanism at a predetermined point, a brake acting on the platform through said chain, and means for subsequently rendering said brake effective when at another predetermined point.

2. An automobile turntable or the like comprising a rotatable platform, sprocket teeth on the periphery of the platform, a sprocket chain drivably engaging the sprocket teeth, power driving mechanism operatively engaging the sprocket chain and an independently controlled brake acting on the power driving mechanism.

3. An automobile turntable or the like comprising a rotatable platform having sprocket teeth on the periphery, a sprocket chain drivably engaging the teeth, power drive mechanism operatively engaging the sprocket chain, cam means on the periphery of the platform for throwing off the power of said mechanism at a predetermined point, a brake acting on the platform through said chain, and means for rendering said brake effective at another predetermined point.

4. An automobile turntable or the like comprising a rotatable platform having sprocket teeth on the periphery, a sprocket chain drivably engaging the teeth, power drive mechanism operatively engaging the sprocket chain, a brake acting on the platform through said chain and cam means on the chain for rendering the brake effective when the power has been thrown off.

5. An automobile turntable or the like comprising a rotatable platform, sprocket teeth on the periphery of the platform, a sprocket chain drivably engaging the sprocket teeth, power driving mechanism operatively engaging the sprocket chain, a brake acting on the platform through said chain, cam means on the periphery of the platform for throwing off the power of said mechanism at a predetermined point and cam means on the chain for rendering the brake effective when the power has been thrown off.

6. In an automobile turntable, a rotatable platform, a motor operatively connected to said platform, a brake for stopping and holding said platform, means for applying power to the motor and releasing the brake simultaneously, means for cutting off the power from the motor at a predetermined point, and means for applying the brake at a later predetermined point.

7. In an automobile turntable, a rotatable platform, a motor operatively connected to said platform, a brake for stopping and holding said platform, means for applying power to the motor and releasing the brake simultaneously, means for cutting off the power from the motor at a predetermined point, means for applying the brake at a later predetermined point, and parts moving with the platform, said first named means being manually operated and said last named means being operated by said parts.

8. In an automotive turntable, a rotatable platform, an electric motor operatively connected to rotate the platform, a brake for stopping and holding said platform, a manually operated switch for applying electric power to the motor and simultaneously releasing said brake, a second switch for cutting off power from the motor, a third switch for applying the brake, parts moving with said platform adapted to operate said second and third switches successively at predetermined different points and a fourth manually operated switch for cutting off power from the motor at any point.

9. In an automobile turntable, a rotatable platform, an electric motor operatively connected to rotate said platform, a normally engaged brake for stopping and holding said platform, a solenoid for releasing said brake, a solenoid operated switch for energizing the motor and the brake solenoid simultaneously, manual switches for operating said solenoid switch, a holding circuit for the solenoid switch closed by the solenoid switch, manual switches in said holding circuit for releasing the solenoid switch, another switch in the holding circuit, a part moving with the platform for opening said other switch at a predetermined point, a second holding circuit for said brake solenoid, a switch in said second holding circuit, and a part moving with said platform for closing said last switch and opening it at another predetermined point.

VINCENT BENDIX.
DONALD BOOTHBY.
LEE L. SMALLEY.